(12) United States Patent
Watanabe et al.

(10) Patent No.: US 8,441,300 B2
(45) Date of Patent: May 14, 2013

(54) INTERFACE CIRCUIT, LSI, SERVER DEVICE, AND METHOD OF TRAINING THE INTERFACE CIRCUIT

(75) Inventors: Keiki Watanabe, Tachikawa (JP); Takashi Muto, Hamura (JP); Hideki Koba, Ome (JP)

(73) Assignee: Hitachi, Ltd., Tokyo (JP)

( * ) Notice: Subject to any disclaimer, the term of this patent is extended or adjusted under 35 U.S.C. 154(b) by 143 days.

(21) Appl. No.: 13/014,617

(22) Filed: Jan. 26, 2011

(65) Prior Publication Data
US 2011/0181335 A1    Jul. 28, 2011

(30) Foreign Application Priority Data

Jan. 27, 2010    (JP) .................................. 2010-014991

(51) Int. Cl.
*H03L 5/00*    (2006.01)

(52) U.S. Cl.
USPC .......................................... 327/333; 327/544

(58) Field of Classification Search ................... 327/333, 327/544
See application file for complete search history.

(56) References Cited

U.S. PATENT DOCUMENTS

| | | | | |
|---|---|---|---|---|
| 6,289,047 B1 * | 9/2001 | Agazzi et al. | ................. | 375/232 |
| 7,634,001 B2 * | 12/2009 | Agazzi et al. | ................. | 375/232 |
| 2007/0229185 A1 | 10/2007 | Matsushima | | |
| 2009/0261880 A1 | 10/2009 | Nagashima et al. | | |

FOREIGN PATENT DOCUMENTS

| | | |
|---|---|---|
| JP | 2007-209030 | 8/2007 |
| JP | 2007-274028 A | 10/2007 |

OTHER PUBLICATIONS

Office Action issued Jan. 31, 2012, in Japanese Patent Application No. 2010-014991.

* cited by examiner

*Primary Examiner* — Kenneth B. Wells
(74) *Attorney, Agent, or Firm* — Miles & Stockbridge P.C.

(57) ABSTRACT

Power consumption is increased in an interface circuit having a signal processing function for waveform shaping due to influence of a circuit added for waveform shaping. Also, since a plurality of boards are connected to a backplane in a system, they are not exchanged in accordance with distances while there are boards being far or near are mixed, but a common board is used. Thus, it is necessary to prepare a configuration of an interface circuit meeting the longest transfer distance. An interface circuit disabling a part of or all of operations of a waveform shaping circuit is provided. Accordingly, in accordance with transfer distances, switching of operation ranges of waveform shaping circuit inside the interface circuit is possible, and operation ranges of the waveform shaping circuit can be limited, and power consumption of the interface circuit, an LSI including the interface circuit, and a server device can be reduced.

2 Claims, 3 Drawing Sheets

INTERFACE CIRCUIT, LSI, SERVER DEVICE, AND METHOD OF TRAINING THE INTERFACE CIRCUIT

CROSS-REFERENCE TO RELATED APPLICATION

The present application claims priority from Japanese Patent Application No. 2010-014991 filed on Jan. 27, 2010, the content of which is hereby incorporated by reference into this application.

TECHNICAL FIELD OF THE INVENTION

The present invention relates to an interface circuit, an LSI including the interface circuit, a server device, and a method of training the interface circuit.

BACKGROUND OF THE INVENTION

In recent years, larger capacities of data and faster speed of communications in computer network communications have been desired. Here, in data processing on a network, performance of inter-device communication of server devices supporting data communications has been a bottle neck. In the server device, a plurality of boards are connected to a printed circuit board, called backplane, to which a connector and a slot provided in a chassis of the server device are attached. In data communication in the server device, transfer and reception of signals are performed between boards via the backplane. In this situation, a distance for the signals to be transferred is about 20 cm to 100 cm, and the longer the transferred distance, the larger a distortion of signal waveforms to flow on the backplane, making it difficult to accurately transfer signals. To solve this problem, a signal processing technology for accurately correcting distorted signal waveforms has been studied. Particularly, technology, called FFE (Feed Forward Equalization), of transmitting waveforms distorted in an opposite direction from a transferring side while predicting a distortion of a signal waveform is effective and generally used as described in Japanese Patent Application Laid-Open Publication No. 2007-209030.

SUMMARY OF THE INVENTION

When aiming to achieve the signal processing technology as described above, a problem has been raised that power consumption is increased due to influence of a circuit (waveform shaping circuit, hereinafter) added for waveform adjustment and/or waveform shaping. In the server device, while a plurality of boards are connected to the backplane and thus short and long transfer distances are mixed among boards, it is not that the boards can be exchanged in accordance with distances but that a common board is used. Therefore, an interface circuit provided to each board for transferring signals among boards is necessary to be prepared in a configuration capable of meeting the longest transfer distance. The longer a transfer distance between boards, the larger the size of a waveform shaping circuit. Therefore, waveform shaping circuits having a size meeting the longest transfer distance between boards are prepared in the interface circuit, and they will be used in a place where a transfer distance is short. In this manner, there are problems raised that power consumption is wasted by a waveform shaping circuit having an unnecessarily large size, and power consumption of an LSI having the interface circuit and/or a whole of the server device is increased.

An interface circuit of the present invention disables part of or all of operations of a waveform shaping circuit. In this manner, operational ranges of the waveform shaping circuit inside the interface circuit can be switched depending on transfer distances.

The present invention is capable of limiting operational ranges inside a waveform shaping circuit and reducing power consumption of an interface circuit, an LSI including the interface circuit, and/or a server device.

BRIEF DESCRIPTIONS OF THE DRAWINGS

DESCRIPTIONS OF THE PREFERRED EMBODIMENTS

Figure 1:
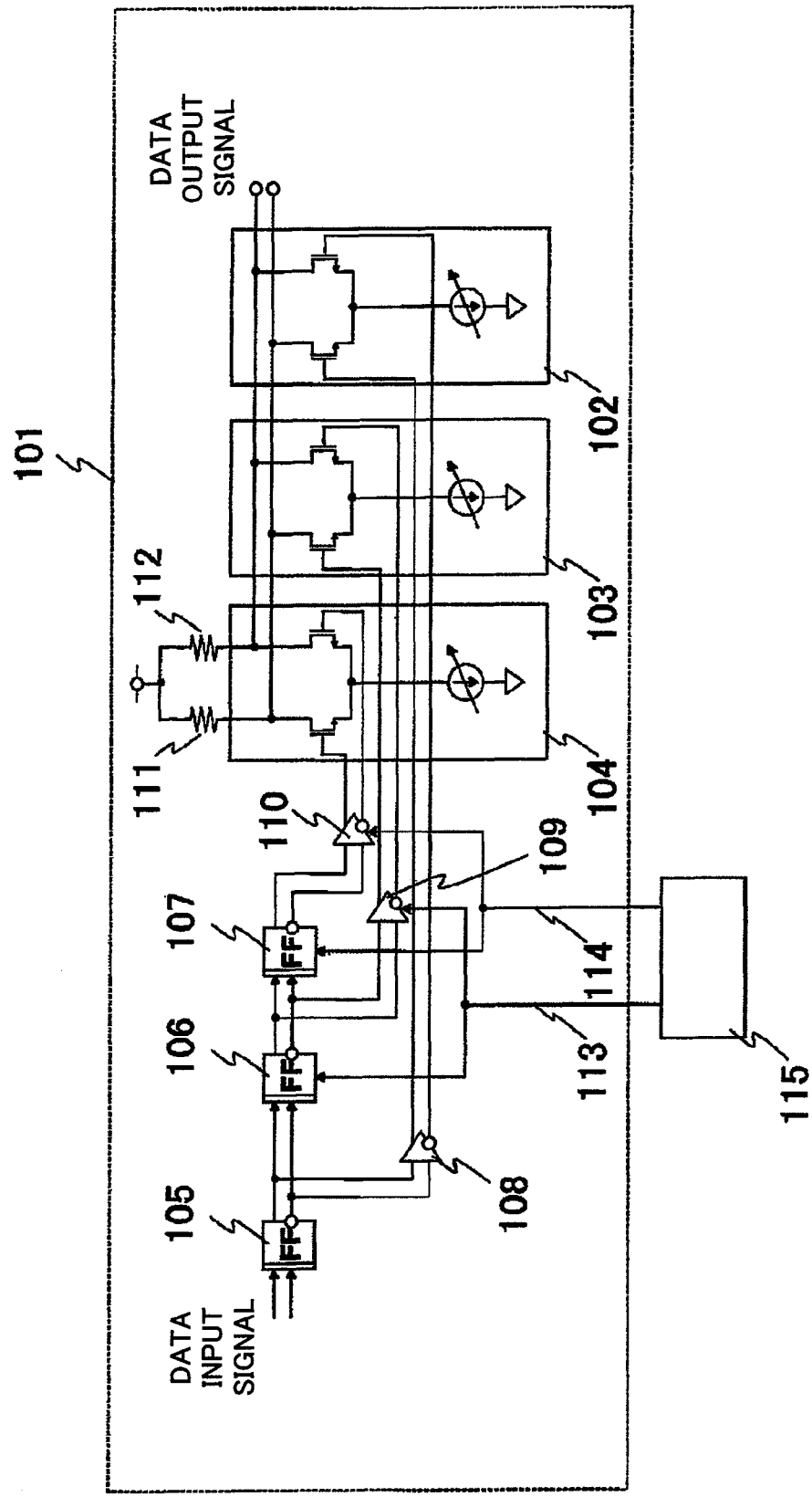
FIG. 1 is a diagram illustrating an example of an embodiment of an interface output circuit of the present invention.

FIG. 1 illustrates an embodiment of an interface output circuit 101 of the present invention. The interface output circuit 101 includes three CML (current mode logic) circuits. They are a CML circuit 102 of a signal output circuit which outputs signals as voltage amplitude, a CML circuit 103 connected to the CML circuit 102 and used in a waveform shaping circuit, and a CML circuit 104. The interface output circuit 101 includes a flip-flop circuit 105 which retains, i.e., latches a data input signal to the interface output circuit 101, a flip-flop circuit 106, and a flip-flop circuit 107. The data input signal is first inputted to the flip-flop circuit 105.

In the present embodiment, the three flip-flop circuits 105, 106, and 107 are connected in series, and in a configuration of a shift circuit in which the data input signal reaches an output of the flip-flop circuit 107 by three clock signals. An output signal of the flip-flop circuit 105 retains a signal prior to the current data input signal by 1 bit in terms of a period of clock signal. An output signal of the flip-flop circuit 106 retains a signal prior to the current data input signal by 2 bits. An output signal of the flip-flop circuit 107 retains a signal prior to the current data input signal by 3 bits.

The interface output circuit 101 includes buffer circuits 108, 109, and 110 for transmitting the output signals of the flip-flop circuits 105, 106, and 107 to the CML circuits 102, 103, and 104, respectively. The interface output circuit 101 is an adder circuit formed of the CML circuit 102, the CML circuit 103, and the CML circuit 104. In the present embodiment, three CML circuits in total of the CML circuits 102, 103, and 104 are used, and output points of respective differential circuits are short-circuited among the three CML circuits, and connected to common load resistors 111 and 112, and thus a function of adding the outputs of the three CML circuits is obtained. In addition, the CML circuit 102 is connected to the buffer circuit 108, the CML circuit 103 is connected to the buffer circuit 109, and the CML circuit 104 is connected to the buffer circuit 110, respectively, and each CML circuit has a configuration of amplifying input signals from corresponding buffer circuits. Drive current of the CML circuits can be independently adjusted.

The flip-flop circuits 106 and 107 and the buffer circuits 109 and 110 can be switched between an operating state and a disabled state, respectively, and power consumption of each circuit can be suppressed to substantially 0 W in the disabled state. More specifically, switches for blocking driving current, that is, power supply to each circuit of the flip-flop circuits 106 and 107 and the buffer circuits 109 and 110 are respectively provided to the circuits as disabling mechanisms, and thus switching between the operating state and the disabled state is performed by blocking power supply by the switches. Alternatively, switches for disabling signal transmission to each circuit of the flip-flop circuits 106 and 107 and the buffer circuits 109 and 110 are provided as a disabling mechanism to each circuit, and thus switching between an operating state and a disabled state is performed by disabling signal transmission by the switches. As to the flip-flop circuit 106 and the buffer circuit 109, a control signal 113 is inputted to the switch described above for switching an operating state and a disabled state. In addition, as to the flip-flop circuit 107 and the buffer circuit 110, control signal 114 for switching an operating state and a disabled state is inputted to the switch described above, respectively. The control signals 113 and 114 are outputted from a control circuit 115. The control circuit 115 is a circuit which performs setting of the waveform shaping circuit of the interface output circuit 101.

Operations of the interface output circuit 101 as a whole will be described. When taking an output signal of the flip-flop circuit 105 at a first stage as a reference, an output of the flip-flop circuit 106 of a second stage becomes a signal prior to a reference signal by 1 bit in terms of signal rate, and an output signal of the flip-flop circuit 107 at a third stage becomes a signal prior to the reference signal by 2 bits. The waveform shaping function of the interface output circuit 101 performs an operation of applying an amplitude correction on signal amplitude of the reference signal using signs of 1-bit and 2-bit prior signals. For example, when a sign of the 1-bit prior signal is a Hi level, setting current of the CML circuit 103 receiving the output of the flip-flop circuit 106 at the second stage can reduce the signal amplitude of the reference signal only by the setting current. Also, when the sign of the 2-bit prior signal is a Hi level, setting current of the CML circuit receiving the output of the flip-flop circuit 107 at the third stage can increase the signal amplitude of the reference signal only by the setting current. That is, the waveform shaping circuit of the interface output circuit 101 has two stages of amplitude correcting circuits, one of them having the flip-flop circuit 106, the buffer circuit 109 and the CML circuit 103, and the other one has the flip-flop circuit 107 and the buffer circuit 110 and the CML circuit 104.

Here, when the distance of the transfer path is short, one of the CML circuits 103 and 104 or both of the CML circuits 103 and 104 may be unnecessary to be operated. By stopping operations of a flip-flop circuit and a buffer circuit connected to a CML circuit being unnecessary to be operated, the power consumption of the interface output circuit 101 can be suppressed. That is, the interface output circuit 101 has a function of partially limiting an operation range of the waveform shaping circuit, thereby suppressing the power consumption. More specifically, operations of circuits, which are connected to a CML circuit unnecessary to be operated, among the flip-flop circuits 106 and 107 and the buffer circuits 109 and 110 are disabled in accordance with the operation disable control signals 113 and 114. In this manner, operations of the amplitude correction circuits can be disabled per stage. More specifically, a part of or the whole of operations a plurality of stages can be disabled, thereby reducing the power consumption. Particularly, when operations of the flip-flop circuits 106 and 107 are continued responding to the data input signal, the power is steadily consumed, and thus the effect of power consumption reduction by disabling operations of the flip-flop circuits 106 and 107 is large. Therefore, by providing the operation disabling mechanism described above only to the flip-flop circuits 106 and 107 without providing the operation disabling mechanism described above to the buffer circuits 109 and 110, the effect of reducing power consumption can be also sufficiently achieved. In the above-described manner, the interface output circuit 101 of the present embodiment can reduce power consumption by partially disabling operations of the waveform shaping circuits, that is, partially limiting the operation range of the waveform shaping circuits.

While the interface output circuit 101 has a two-stage amplitude correction circuit including the CML circuit 103 and the CML circuit 104 in the present embodiment, when there is an increase in influence of reflection observed in a high-speed transfer exceeding Gbps, an increase in transfer distance, and an increase in the number of through-holes of a board etc. or the number of connectors, the size of the signal processing circuit for waveform shaping is further increased. That is, the number of stages of the amplitude correcting circuit is further increased. Therefore, the amount of increase in power consumption of the waveform shaping circuit having the amplitude correcting circuit is further increased, and the effect of power consumption reduction by using the present invention is further increased.

To determine a range of disabling operation of the waveform shaping circuit described above, a stage of the transfer system is previously examined per an interface circuit. To do this, training is carried out before starting communications. From a result of the training, a circuit to be necessary for the waveform shaping is determined, and an operation of an unnecessary circuit is disabled.

Figure 2:
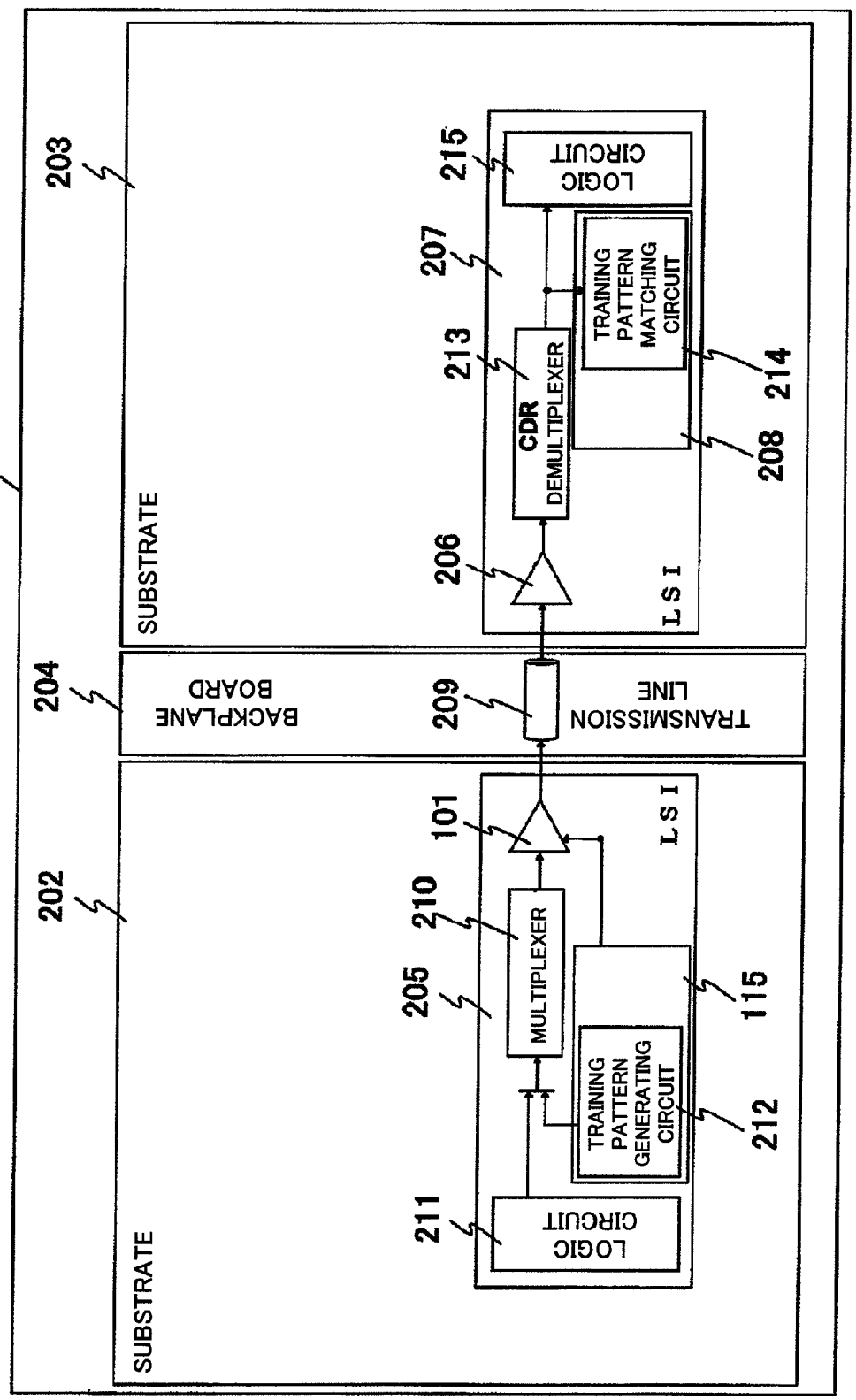
FIG. 2 is a diagram illustrating an example of an embodiment of a server device in which an interface circuit of the present invention is used.

FIG. 2 illustrates an embodiment of a server device having a function of carrying out the training. A server device 201 includes a board 202, a board 203, and a backplane board 204 which connects the board 202 and the board 203. The board 202 includes an LSI 205 that includes the interface output circuit 101. The board 203 includes an LSI 207 having an interface input circuit 206. Further, as a control circuit, the control circuit 115 is provided to the LSI 205 and a control circuit 208 is provided to the LSI 207. Signals outputted from the interface output circuit 101 are inputted to the interface output circuit 206 via a transfer path 209 on the backplane board 204. While only an output system from the LSI 205 to the LSI 207 is illustrated in FIG. 2, a communication path of an output from the LSI 207 to the LSI 205 is also provided on a transfer path on the backplane board 204. The control circuit 115 and the control circuit 208 bidirectionally communicate using the communication path between the LSI 205 and the LSI 207 mentioned above to work as one pair of control circuits.

The LSI 205 has a multiplexer circuit 210, and inputs signals from a logic circuit 211 of the LSI 205 and signals from the control circuit 115 to the interface output circuit 101 via the multiplexer circuit 210. The control circuit 115 has a training pattern generating circuit 212. A training pattern generated by the training pattern generating circuit 212 is inputted to the interface output circuit 101 via the multiplexer circuit 210.

The LSI 207 has a circuit 213 having functions of demultiplexer and clock data recovery (CDR) to which an output of the interface output circuit 206 is inputted. Signals from the circuit 213 are inputted to a training pattern determination circuit 214 that is included in the control circuit 208 or the logic circuit 215.

The server device in FIG. 2 includes the training pattern generating circuit 212 in the LSI 205 of the transmitting-side board 202, and the training pattern generating circuit 214 in the LSI 207 of the receiving-side board 203. During the training, a pattern is generated from the transmitting-side training pattern generating circuit 212 and an error of the pattern is monitored by the receiving-side pattern determining circuit 214. This process is repeated with changing settings of the waveform shaping function on the transmitting side, that is, settings of waveform shaping using the flip-flop circuits 106 and 107, the buffer circuits 109 and 110, and the CML circuits 103 and 104, so that the optimum waveform shaping settings are derived by taking the number of errors in the pattern as a reference. In the server device of the present embodiment, an unnecessary part not being used in the waveform shaping of the amplitude correcting circuit when the optimum settings are determined, i.e., an unnecessary stage is revealed, and thus the operations of circuits of unnecessary stages at this point are disabled, thereby reducing the power consumption. In the present embodiment, operations of unnecessary stages of circuits among the flip-flop circuits 106 and 107, and the buffer circuits 109 and 110 are disabled.

Figure 3:
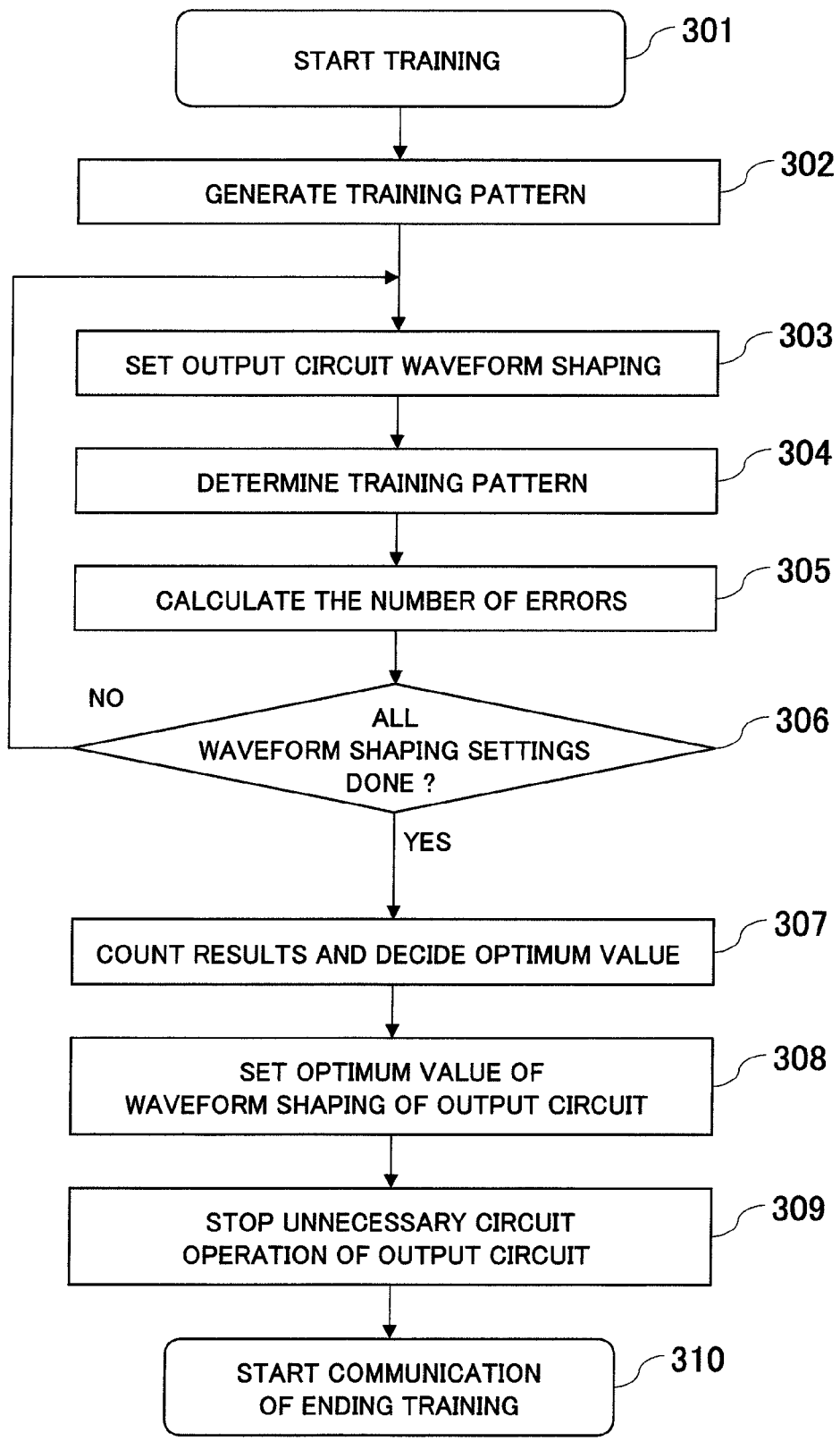
FIG. 3 is a diagram illustrating an example of an embodiment of a training flow for performing a power control setting of the interface circuit of the present invention.

FIG. 3 illustrates a training flow of the server device illustrated in FIG. 2 and an operation-disabling determining flow of an unnecessary part, i.e., an unnecessary stage. As the control circuit 115 on the transmitting side and the control circuit 208 on the receiving side cooperate, training is started (step 301). Next, a training pattern is generated from the training pattern generating circuit 212 of the control circuit 115 (step 302). The control circuit 115 carries out one waveform shaping setting among a plurality of settings of the interface output circuit 101 (step 303). The control circuit 208 calculates and records the number of errors as to the waveform shaping setting being set from a result of determining a coincidence of training patterns by the training pattern determining (matching) circuit 214 (step 305). The steps from the step 303 to step 305 are repeated until all patterns of waveform settings planned are ended (step 306). The control circuit 208 derives a setting having the least number of errors to decide the optimum setting (step 307). The control circuit 115 receives the decided final setting from the control circuit 208 and carries out setting of an optimum value of waveform shaping of the interface output circuit 101 (step 308). And, the control circuit 115 disables operations of circuits included in stages unnecessary in the waveform shaping according to the result of the training (step 309). The training ends here and communication from the board 202 to the board 203 is started (step 310).

According to the foregoing, a training pattern is generated from the transmitting side, and the waveform shaping setting of the interface output circuit 101 is carried out, signals are received on the receiving side, an error determination is performed by confirming a pattern coincidence of training patterns, and the number of errors is recorded. Thereafter, after changing the waveform shaping setting and repeating the same operations, and then, when all predetermined waveform shaping settings are finished, all results are tallied and a setting having the least number of errors is derived, and a waveform shaping setting is carried out based on a result of the derivation. Upon the waveform shaping setting, since a part to be unnecessary to be operated in a waveform shaping inside the waveform shaping circuit will be revealed, operation of a corresponding part, i.e., a circuit included in a corresponding stage is disabled, and thus a reduction of power consumption of an interface circuit is possible. Moreover, power consumption of an LSI including an interface circuit and a server device can be reduced.

What is claimed is:
1. A server device comprising:
a first board;
a second board connected to the first board by a transfer path;
a signal output circuit provided to the first board and outputting signals from the first board to the second board as voltage amplitude;
an amplitude correcting circuit having a plurality of stages connected to an output of the signal output circuit and performing a waveform shaping of the voltage amplitude; and
a control circuit performing training of the amplitude correcting circuit,
wherein the control circuit disables operation of a stage which is unnecessary in the waveform shaping according to a result of the training among the plurality of stages of the amplitude correction circuit,
wherein the amplitude correcting circuit has a respective flip-flop circuit latching the signals at each stage,
the amplitude correcting circuit is operated in accordance with an output of the flip-flop circuit which is included in each of the stages,
the server device disables operation of the flip-flop circuit at the stage unnecessary in the waveform shaping,
wherein the signal output circuit includes a CML circuit generating the voltage amplitude,
the amplitude correcting circuit has a respective CML circuit at each of the stages and to which an output signal of the corresponding flip-flop circuit is supplied, and
the CML circuit of the signal output circuit and the CML circuits of the amplitude correcting circuit are short-circuited at an output point of each of differential circuits and connected to common load resistors.

2. The server device according to claim 1, comprising a backplane board to which the first board and the second board are connected,
wherein a transfer path between the first board and the second board is provided on the backplane board.

* * * * *